United States Patent [19]

Kirchmayr et al.

[11] Patent Number: 4,510,290
[45] Date of Patent: Apr. 9, 1985

[54] ACID-CURABLE COMPOSITION CONTAINING A MASKED CURING CATALYST, AND A PROCESS FOR THE CURING THEREOF

[75] Inventors: Rudolf Kirchmayr, Aesch; Werner Rutsch, Reinach, both of Switzerland

[73] Assignee: Ciba Geigy Corporation, Ardsley, N.Y.

[21] Appl. No.: 455,173

[22] Filed: Jan. 3, 1983

[30] Foreign Application Priority Data

Jan. 11, 1982 [CH] Switzerland .............................. 123/82
Aug. 31, 1982 [CH] Switzerland .......................... 5174/82

[51] Int. Cl.³ ............................................. C08L 61/28
[52] U.S. Cl. ................................ 525/162; 204/159.18; 204/159.21; 524/512; 525/132; 525/163; 525/442; 525/443; 260/DIG. 38
[58] Field of Search ................ 528/143, 259; 525/162, 525/143, 498, 132, 442, 443; 204/159.18, 159.21; 524/512; 106/20; 260/DIG. 38

[56] References Cited

U.S. PATENT DOCUMENTS 3,474,054 10/1969 White ...................................... 524/39
3,732,273 5/1973 Heine et al. ...................... 260/456 R
4,102,687 7/1978 Crivello .......................... 204/159.18

OTHER PUBLICATIONS

B. C. B. Bezuidenhoudt, et al., J. Chem. Soc., Perkin I, 1981, 263.
I. J. Borowitz, et al., J. Org. Chem., 34, 1595, (1969).
S. N. Semenova, et al., J. Org. Chem. (USSR), 8, 2166, (1972).
G. F. Koser, et al., J. Org. Chem., 47, 2487, (1982).

K. V. Auwers, et al., Ann, 526, 143, (1936).
C. L. Stevens, et al., J. Am. Chem. Soc., 76, 4402, (1954).

Primary Examiner—Theodore E. Pertilla
Attorney, Agent, or Firm—Luther A. R. Hall

[57] ABSTRACT

Compounds of the formula I and II

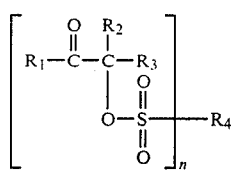

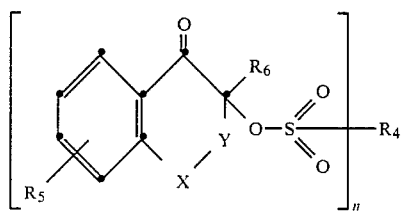

in which $R_1$, $R_2$, $R_3$, $R_4$, $R_5$ and $R_6$, X, Y and n are as defined in claim 1, are latent curing catalysts for acid-curable stoving lacquers. They are distinguished by satisfactory solubility in the acid-curable resin systems, can be stored virtually indefinitely in the dark and, when exposed to shortwave light, make it possible to cure the resins by acid catalysis at a relatively low temperature.

14 Claims, No Drawings

ACID-CURABLE COMPOSITION CONTAINING A MASKED CURING CATALYST, AND A PROCESS FOR THE CURING THEREOF

The invention relates to compositions based on an acid-curable resin and containing a masked curing catalyst and to a process for curing this resin by irradiation with shortwave light, followed by warming.

Acid-curable resins are used, in particular, as binders for lacquers, printing inks and paints, if high stoving temperatures are to be avoided. Acid-curable resins can be amino resins, melamine resins, urea-formaldehyde resins, phenol-formaldehyde resins and mixtures of such resins with alkyd, polyester or acrylic resins. Further acid-curable resins are methylol compounds, methylol ethers of polycarboxylic acid imides, for example derivatives of polyacrylic or methacrylic acid, urethane alkyds and resins containing carboxylic acid esters of N-methylolimides. The acid curing catalysts used are mainly organic acids including, for example, sulfonic acids, in particular p-toluenesulfonic acid. Since these acids result in a slow curing at temperatures as low as room temperature, they are not added to the resin until shortly before the application of the latter, a procedure which is associated with the known problems of observing specific pot lives. In order, therefore, to make one-component systems possible, the use of masked curing catalysts from which the acid is released at elevated temperature, has already been suggested. Examples of these are amine salts of aromatic sulfonic acids, such as the pyridine salts suggested in U.S. Pat. No. 3,474,054. These have the disadvantage that they result in a slow curing even during storage. In addition, problems of odour arise with these products.

The suggestion has also been made, to use masked curing catalysts from which the actual curing catalyst is formed by irradiation with UV light. Examples of these are aromatic sulfonium salts of complex anions, such as are described in U.S. Pat. No. 4,102,687. However, sulfonium salts of this type are difficult to prepare in a pure form, they have a low reactivity and they tend to cause yellowing of the resins. Acting in accordance with the same principle, photolabile sulfonic acid esters have already been suggested, for example sulfonic acid esters of α-hydroxymethylbenzoin, such as are described, for example in German Offenlegungsschrift No. 1,919,678. However, these compounds do not meet, in every respect, the requirements set for them, for example satisfactory solubility in the acid-curable resin systems, no yellowing of the resins after curing and no adverse effect on lacquering by the electrophoretic application process.

It has now been found that sulfonic acid esters of certain α-hydroxycarbonyl compounds, which are easy to prepare on an industrial scale, meet these requirements, since they can be stored in the dark virtually indefinitely, but rapidly decompose when exposed to shortwave light, which makes it possible subsequently to cure the resins at a relatively low temperature by acid catalysis and does not result in yellowing of the resins.

The invention relates to a curable composition containing an acid-curable resin and, as a masked curing catalyst, a compound of the formula I or II

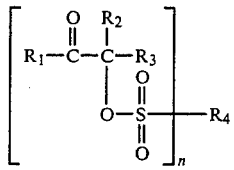

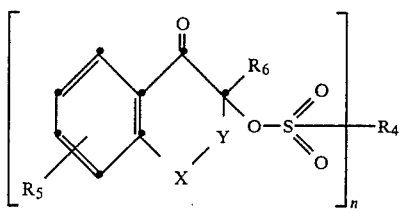

in which n is the number 1 or 2 and $R_1$ is phenyl or naphthyl which is unsubstituted or substituted, for example, by 1, 2 or 3 radicals belonging to the group comprising —Cl, —Br, —CN, —NO$_2$, $C_1$–$C_{12}$-alkyl, $C_1$–$C_4$-alkoxy, phenoxy, tolyloxy, phenylthio, tolylthio, $C_1$–$C_8$-alkylthio, —SCH$_2$CH$_2$OH, $C_1$–$C_4$-alkylsulfonyl, phenylsulfonyl, $C_2$–$C_4$-alkoxycarbonyl, $C_1$–$C_4$-alkylamino, $C_2$–$C_4$-dialkylamino, phenyl—CONH—, $C_1$–$C_4$-alkyl-CONH— or benzoyl, or $R_1$ is also anthryl, phenanthryl, thienyl, pyridyl, furyl, indolyl or tetrahydronaphthyl, and $R_2$ is hydrogen or $C_1$–$C_8$-alkyl which is unsubstituted or substituted, for example, by —OH, —Cl, $C_1$–$C_4$-alkoxy, —CN, $C_2$–$C_5$-alkoxycarbonyl, phenyl, chlorophenyl, $C_7$–$C_{10}$-alkylphenyl or $C_7$–$C_{10}$-alkoxyphenyl, or is also benzoyl, $R_3$ is as defined for $R_2$ and is also phenyl which is unsubstituted or substituted, for example, by —Cl, $C_1$–$C_4$-alkyl, $C_1$–$C_4$-alkoxy or $C_1$–$C_4$-alkylthio, $C_2$–$C_8$-alkoxycarbonyl, —CN, $C_1$–$C_4$-alkyl-NH-CO—, phenyl-NH-CO— or —CONH$_2$, or $R_2$ and $R_3$, together with the carbon atom to which they are attached, constitute a $C_4$–$C_6$-cycloalkyl ring, X is —O—, —S—, —SO$_2$—, —CH$_2$—, —C(CH$_3$)$_2$— or >N-COR$_7$, $R_7$ being $C_1$–$C_4$-alkyl or phenyl, and Y is a direct bond or —CH$_2$—, and, if n=1, $R_4$ is $C_1$–$C_{18}$-alkyl, phenyl which is unsubstituted or substituted, for example, by halogen, $C_1$–$C_{12}$-alkyl, $C_1$–$C_4$-alkoxy, $C_1$–$C_4$-alkyl-CONH—, phenyl-CONH—, —NO$_2$ or benzoyl, naphthyl which is unsubstituted or substituted, for example, by halogen, $C_1$–$C_{12}$-alkyl or $C_1$–$C_4$-alkoxy, $C_5$–$C_6$-cycloalkyl, $C_7$–$C_9$-aralkyl, camphoryl, —CF$_3$, —CCl$_3$, —F or —NH$_2$, and, if n=2, $R_4$ is a —(CH$_2$)$_m$— group in which m is the number 2 to 8, or $R_4$ is phenylene or naphthylene which is unsubstituted or substituted, for example, by $C_1$–$C_{12}$-alkyl, $R_5$ is H or, for example, 1, 2 or 3 radicals belonging to the group comprising —Cl, —Br, —NO$_2$, $C_1$–$C_{12}$-alkyl, $C_1$–$C_4$-alkoxy, phenoxy, phenylthio, $C_1$–$C_8$-alkylthio or —SCH$_2$CH$_2$OH, and $R_6$ is hydrogen or $C_1$–$C_8$-alkyl which is unsubstituted or substituted, for example, by —OH, —Cl, $C_1$–$C_4$-alkoxy, —CN, $C_2$–$C_5$-alkoxycarbonyl, phenyl, chlorophenyl, $C_7$–$C_{10}$-alkylphenyl or $C_7$–$C_{10}$-alkoxyphenyl, phenyl which is unsubstituted or substituted, for example, by —Cl, $C_1$–$C_4$-alkyl, $C_1$–$C_4$-alkoxy or $C_1$–$C_4$-alkylthio, $C_2$–$C_8$-alkoxycarbonyl or —CN.

$C_1$–$C_{12}$-alkyl substituents in phenyl or naphthyl, as $R_1$, are linear or branched substituents, for example methyl, ethyl, n-propyl, isopropyl, n-butyl, sec.-butyl, tert.-butyl, pentyl, hexyl, heptyl, octyl, nonyl, decyl, undecyl or dodecyl, but particularly methyl. $C_1$–$C_4$-alkoxy substitutents in phenyl or naphthyl, as $R_1$, are, for example, methoxy, ethoxy, propoxy or tert.-butoxy.

$C_1$–$C_8$-alkylthio substituents in phenyl or naphthyl, as $R_1$, and in $R_5$ are linear or branched substituents, for example methylthio, ethylthio, n-propylthio, isopropylthio, n-butylthio, sec.-butylthio, tert.-butylthio, pentylthio, hexylthio, heptylthio or octylthio, but particularly methylthio.

A $C_1$–$C_4$-alkylamino or $C_2$–$C_4$-dialkylamino substituent in phenyl or naphthyl, as $R_1$, is, for example, a methylamino, ethylamino, propylamino or n-butylamino substituent group or a dimethylamino or diethylamino substituent group, respectively.

A $C_1$–$C_4$-alkylsulfonyl substituent in phenyl or naphthyl, as $R_1$, is, for example, methylsulfonyl, ethylsulfonyl, propylsulfonyl, butylsulfonyl or tert.-butylsulfonyl.

A $C_1$–$C_4$-alkyl-CONH— substituent in phenyl or naphthyl, as $R_1$, is, for example, methyl-CONH—, ethyl-CONH—, propyl-CONH— or n-butyl-CONH—. $C_1$–$C_4$-alkyl-NHCO— present in $R_2$ or $R_3$, and $C_1$–$C_4$-alkyl-CONH— present in $R_4$ are, for example, respectively, methyl-NHCO—, ethyl-NHCO—, propyl-NHCO— or n-butyl-NHCO— substituents or methyl-CONH—, ethyl-CONH—, propyl-CONH— or n-butyl-CONH— substituents.

All the position isomers of thienyl, pyridyl, furyl, indolyl or tetrahydronaphthyl, as $R_1$, are suitable. However, preferred position isomers are 2-thienyl, 3-pyridyl, 2-furyl, 3-indolyl or 1,2,3,4-tetrahydro-6-naphthyl.

As $C_1$–$C_8$-alkyl, $R_2$, $R_3$ and $R_6$ are linear or branched alkyl groups, but preferably linear $C_1$–$C_4$-alkyl groups, for example methyl, ethyl, n-propyl or n-butyl.

$C_1$–$C_4$-alkoxy substituents in $C_1$–$C_8$-alkyl, as $R_2$, $R_3$ and $R_6$, or in phenyl or naphthyl, as $R_4$ or $R_5$, are, for example, methoxy, ethoxy, propoxy or tert.-butoxy substituents.

$C_7$–$C_{10}$-alkylphenyl or $C_7$–$C_{10}$-alkoxyphenyl substituents in $C_1$–$C_8$-alkyl, as $R_2$, $R_3$ and $R_6$, are, for example, methylphenyl, methoxyphenyl, ethylphenyl, ethoxyphenyl, tert.-butylphenyl or tert.-butoxy-phenyl.

$C_1$–$C_4$-alkylthio substituents in phenyl, as $R_3$ and $R_6$, are, for example, methylthio, ethylthio, propyl-thio or tert.-butylthio.

A cycloalkyl ring which is formed by $R_2$ and $R_3$ together with the C atom to which they are attached, is, for example, a cyclopentane, cyclohexane or cycloheptane ring, but particularly a cyclohexane ring.

If n=1: $C_1$–$C_{18}$-alkyl which is represented by $R_4$ is a linear or branched group, for example methyl, ethyl, propyl, isopropyl, butyl, tert.-butyl, pentyl, hexyl, heptyl, octyl, nonyl, decyl, 2-ethylhexyl, undecyl, dodecyl, tert.-dodecyl, tridecyl, tetradecyl, hexadecyl or octadecyl.

$C_1$–$C_{12}$-alkyl substituents in phenyl or naphthyl, as $R_4$, and in $R_5$ are linear or branched alkyl groups.

$C_5$–$C_6$-cycloalkyl which is represented by $R_4$ is cyclopentyl and cyclohexyl.

$C_7$–$C_9$-aralkyl which is represented by $R_4$ is, for example, 1-phenylethyl, 2-phenylethyl or benzyl.

Camphoryl as $R_4$ is 10-camphoryl.

If n=2: a —$(CH_2)_m$— group which is represented by $R_4$ is, for example, ethylene, propylene, butylene, pentylene or hexamethylene.

$C_1$–$C_{12}$-alkyl substituents in phenylene or naphthylene are linear or branched alkyl groups.

If the various phenyl groups in the radicals $R_1$, $R_3$, $R_4$ and $R_6$ are substituted by radicals other than hydrogen atoms, this substitution takes place in the ortho-, meta- or para-position, but particularly in the para-position.

Preferred curing catalysts are those of the formula I wherein n is the number 1 or 2, $R_1$ is phenyl or naphthyl which is unsubstituted or is substituted, for example, by —Cl, —Br, $C_1$–$C_8$-alkyl, $C_1$–$C_4$-alkoxy, phenoxy, tolyloxy, phenylthio, tolylthio, —$SCH_2CH_2OH$, $C_1$–$C_8$-alkylthio or benzoyl, or is anthryl or phenanthryl, $R_2$ is hydrogen or $C_1$–$C_8$-alkyl which is unsubstituted or is substituted, for example, by —OH, —Cl, —CN, $C_2$–$C_5$-alkoxycarbonyl, phenyl, chlorophenyl, $C_7$–$C_{10}$-alkylphenyl or $C_7$–$C_{10}$-alkoxyphenyl and $R_3$ is the same as $R_2$, as defined above, and is also phenyl which is unsubstituted or is substituted, for example, by —Cl, $C_1$–$C_4$-alkyl, $C_1$–$C_4$-alkoxy or $C_1$–$C_4$-alkylthio, or is $C_2$–$C_4$-alkoxycarbonyl or —CN, or $R_2$ and $R_3$, together with the carbon atom to which they are attached, form a $C_4$–$C_6$-cycloalkyl ring and, if n=1, $R_4$ is $C_1$–$C_{18}$-alkyl, phenyl which is unsubstituted or is substituted, for example, by —Cl, $C_1$–$C_{12}$-alkyl or $C_1$–$C_4$-alkoxy, or is naphthyl which is unsubstituted or is substituted, for example, by —Cl or $C_1$–$C_{12}$-alkyl, or $R_4$ is also camphoryl, —$CF_3$ or —F, and, if n=2, $R_4$ is a —$(CH_2)_m$ group, phenylene or naphthylene, m being the number 2, 3 or 4.

Particularly preferred curing catalysts are those of the formula I in which n=1 and $R_1$ is phenyl which is unsubstituted or is substituted, for example, by chlorine, methyl, methoxy, methylthio, phenylthio, —$SCH_2C$-$H_2OH$ or benzoyl, $R_2$ is hydrogen or $C_1$–$C_4$-alkyl, $R_3$ is hydrogen, $C_1$–$C_4$-alkyl or phenyl, or $R_2$ and $R_3$, together with the carbon atom to which they are attached, form a cyclohexane ring and $R_4$ is $C_1$–$C_{18}$-alkyl, unsubstituted phenyl or naphthyl, or camphoryl.

Curing catalysts which are very particularly preferred are those of the formula I in which n=1, $R_1$ is phenyl, p-tolyl or p-methylthiophenyl, $R_2$ is hydrogen, $R_3$ is methyl, isopropyl, n-decyl or benzyl and $R_4$ is phenyl, p-tolyl or p-n-dodecylphenyl.

Curing catalysts which are also particularly preferred are those of the formula II in which n=1, $R_5$ and $R_6$ are hydrogen, X and Y are a —$CH_2$— group and $R_4$ is $C_1$–$C_{18}$-alkyl, phenyl or naphthyl which is unsubstituted or is substituted, for example, by $C_1$–$C_{12}$-alkyl, or is camphoryl.

The following are examples of individual compounds of the formula I: 2-[(p-tolylsulfonyl)-oxy]-1-phenyl-1-propanone, 2-[(p-tolylsulfonyl)-oxy]-1-p-tolyl-1-propanone, 2-[(p-chlorophenylsulfonyl)-oxy]-1-phenyl-1-propanone, 2-[(p-laurylphenylsulfonyl)-oxy]-1-phenyl-1-propanone, 2-[(p-methoxyphenylsulfonyl)-oxy]-1-phenyl-1-propanone, 2-[(p-methylthiophenylsulfonyl)-oxy]-1-phenyl-1-propanone, 2-[(p-actamidophenylsulfonyl)-oxy]-1-phenyl-1-propanone, 2-[(methylsulfonyl)-oxy]-1-phenyl-1-propanone, benzoin toluenesulfonate, benzoin methanesulfonate, benzoin p-dodecylbenzenesulfonate, 4,4'-bis-methylthiobenzoin toluenesulfonate, 2-[(o-nitrophenylsulfonyl)-oxy]-1-phenyl-1-propanone, 2-[(benzylsulfonyl)-oxy]-1-phenyl-1-propanone, 2-[(n-octylsulfonyl)-oxy]-1-phenyl-1-propanone, 2-[(cyclohexylsulfonyl)-oxy]-1-phenyl-1-propanone, 2-[(phenylsulfonyl)-oxy]-1-phenyl-1-propanone, 2-[(-naphthylsulfonyl)-oxy]-1-phenyl-1-propanone, 2-[(trifluoromethylsulfonyl)-oxy]-1-phenyl-1-propanone, 2-[(-chloroethylsulfonyl)-oxy]-1-phenyl-1-propanone, 2-[(mesitylsulfonyl)-oxy]-1-phenyl-1-propanone, 2-[(10'-camphorylsulfonyl)-oxy]-1-phenyl-1-propanone, 1- benzoyl-1-methylsulfonyloxy-cyclohexane, 2-[(p-tolyl-sulfonyl)-oxy]-1-(2'-thienyl)-1-propanone, 2-[(methyl-sulfonyl)-oxy]-1-(6'-tetralin)-1-propanone, 2-[(p-tolyl-sulfonyl)-oxy]-1-phenyl-1-octanone, 2-[(p-tolylsul-fonyl)-oxy]-1-phenyl-1-dodecanone, 2-[(p-tolylsul-fonyl)-oxy)-1-p-tolyl-1-dodecanone, 2-](methylsul-fonyl)-oxy[-4-ethoxycarbonyl-1-phenyl-1-butanone, 2-](p-tolylsulfonyl)-oxy[-acetophenone, 2-](p-tolylsul-fonyl)-oxy[-2-methyl-1-phenyl-1-propanone, 2-](10'-camphorylsulfonyl)-oxy[-acetophenone, 2-(10'-cam-phorylsulfonyl)-oxy]-2-methyl-1-(p-methyl)-phenyl-1-propanone, 2-[(10'-camphorylsulfonyl)-oxy]-2-methyl-1-(p-methylthio)-phenyl-1-propanone, 2-[(10'-cam-phorylsulfonyl)-oxy]-1-p-(-hydroxyethylthio)-phenyl-1-propanone, 2-[(10'-camphorylsulfonyl)-oxy]-1-(p-chloro)-phenyl-1-propanone, 2-[(p-tolylsulfonyl)-oxy]-1,3-bis-phenyl-1-propanone, 2-[(methylsulfonyl)-oxy]-1,3-bis-phenyl-1-propanone, 2-[(p-tolylsulfonyl)-oxy]-3-phenyl-1-p-tolyl-1-propanone, 2-[(p-laurylphenylsul-fonyl)-oxy]-1,3-bis-phenyl-1-propanone, 2-[(p-tolylsul-fonyl)-oxy]-2-methoxymethyl-1-phenyl-1-propanone, 2-[(methylsulfonyl)-oxy]-2-chloromethyl-1-phenyl-1-propanone, 2-[(p-tolylsulfonyl)-oxy]-p-methylthi-oacetophenone, 2-[(methylsulfonyl)-oxy]-1-(p-methyl-thio)-phenyl-1-propanone, 2-[(p-tolylsulfonyl)-oxy]-1-(p-methylthio)-phenyl-1-propanone, 2-[(p-laurylphenyl-sulfonyl)-oxy]-1-(p-methylthio)phenyl-1-propanone, 2-[(p-tolylsulfonyl)-oxy]-3-phenyl-1-(p-methylthio)-phenyl-1-propanone, 2-[(p-tolylsulfonyl)-oxy]-1-(p-phenylthio)-phenyl-1-propanone, 2-[(p-tolylsulfonyl)-oxy]-1-(p-acetamido)-phenyl-1-propanone, 2-[(p-lauryl-phenylsulfonyl)-oxy]-3-methyl-1-p-methylthiophenyl-1-butanone, 2-[(p-tolylsulfonyl)-oxy]-3-methyl-1-phe-nyl-1-butanone, 2-[(p-tolylsulfonyl)-oxy]-3-methyl-1-p-tolyl-1-butanone, 2-[(p-tolylsulfonyl)-oxy]-1- -naphthyl-1-propanone, 2-[(p-tolylsulfonyl)-oxy]-2-ethoxycar-bonylacetophenone, diethyl 3-[(p-tolylsulfonyl)-oxy]-3-benzoylmalonate, (1'-benzoyl)-ethyl phthalic-anhy-dride-5-sulfonate, (1'-methyl-1'-benzoyl)-ethyl N-methylphthalimide-5-sulfonate, bis-(1'-benzoyl)-ethyl naphthalene-2,6-disulfonate and bis-(1'-benzoyl-1'-methyl)-ethyl dinonylnaphthalenedisulfonate.

The following are examples of individual compounds of the formula II: 2-[(methylsulfonyl)-oxy]-2-methylte-tral-1-one, 2-[(methylsulfonyl)-oxy]-tetral-1-one, 2-[(p-tolylsulfonyl)-oxy]-tetral-1-one, 2-[(p-laurylphenylsul-fonyl)-oxy]tetral-1-one, 3-[(p-tolylsulfonyl)-oxy]-chro-mone, 3-[(p-tolylsulfonyl)-oxy]-1-thiochroman-4-one, 3-[(camphorylsulfonyl)-oxy]-1-thiochroman-4-one-S-dioxide, 2-[(methylsulfonyl)-oxy]-coumaran-3-one and 2-[(phenylsulfonyl)-oxy]-indan-1-one.

Many compounds of the formula I are known and can be prepared by known processes, for example by react-ing the corresponding hydroxy compounds of the for-mula III

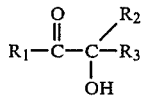

III with one equivalent or with half an equivalent of the corresponding monosulfonyl or disulfonyl chlorides, respectively, of the formula IV

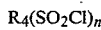 IV in the presence of a base [in this connection see Journal of the Chemical Society, Perkin I, 1981, page 263 or Journal of Org. Chem. 34, 1,595 (1969)], or by reacting the corresponding bromine derivatives of the formula V

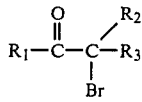

V with one equivalent or with half an equivalent of the silver salts of the corresponding monosulfonic or disul-fonic acid derivatives, respectively, of the formula VI

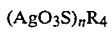 VI for example by the process described in the Journal of Organic Chemistry of the USSR, volume 8, page 2,166 (1972), or, for a specific class of these compounds, by the direct reaction between an acetophenone of the formula VII and the iodonium salt of the formula VIII, giving the corresponding product of the formula IX

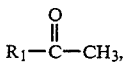

VII

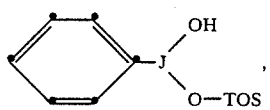

VIII

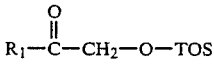

IX (TOS = tosyl)

for example by the process described in the Journal of Org. Chem., 47, 2,487 (1982).

In the formulae III, IV, V and VI, VII and IX, the radicals $R_1$ to $R_4$ and n are as defined above.

Other compounds of the formula I, and also the com-pounds of the formula II, are novel and therefore also form a subject of the present invention. They are pre-pared analogously to the known compounds.

The novel compounds of the formula I have the for-mula X

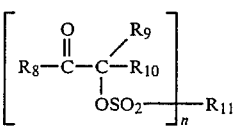

(X)

in which n is the number 1 or 2 and $R_8$ is phenyl or naphthyl which is substituted, for example, by $C_2$–$C_{12}$-alkyl, $C_2$–$C_4$-alkoxy, phenoxy, tolyloxy, phenylthio, tolylthio, $C_1$–$C_8$-alkylthio, —$SCH_2$–$CH_2OH$, $C_1$–$C_4$-alkylsulfonyl, phenylsulfonyl, $C_1$–$C_4$-alkylamino, $C_2$–$C_4$-dialkylamino, phenyl-CONH—, $C_1$–$C_4$-alkyl-CONH— or benzoyl, or $R_8$ is also anthryl, phenanthryl, thienyl, pyridyl, furyl, indolyl or tetrahydronaphthyl, $R_9$ is $C_2$–$C_8$-alkyl or $C_1$–$C_8$-alkyl which is substituted, for example, by —OH, —Cl, $C_1$–$C_4$-alkoxy, —CN, $C_2$–$C_5$-alk-oxycarbonyl, phenyl, chlorophenyl, $C_7$–$C_{10}$-alkyl-phenyl or $C_7$–$C_{10}$-alkoxyphenyl, $R_{10}$ is as defined for $R_9$ and is also phenyl which is substituted by —Cl, $C_1$–$C_4$-alkyl, $C_1$–$C_4$-alkoxy or $C_1$–$C_4$-alkylthio, $C_4$–$C_8$- alkoxycarbonyl, —CN, $C_1$–$C_4$-alkyl-NHCO—, phenyl-NHCO— or —$CONH_2$, or $R_9$ and $R_{10}$, together with the carbon atom to which they are attached, form a $C_4$–$C_6$-cycloalkyl ring, and, if n=1, $R_{11}$ is $C_2$–$C_{18}$-alkyl, phenyl which is substituted, for example, by $C_2$–$C_{12}$-alkyl, $C_2$–$C_4$-alkoxy, $C_1$–$C_4$-alkyl-CONH-, phenyl-CONH- or benzoyl, naphthyl which is unsubstituted or is substituted, for example, by halogen, $C_1$–$C_{12}$-alkyl or $C_1$–$C_4$-alkoxy, $C_5$–$C_6$-cycloalkyl, $C_7$–$C_9$-aralkyl, camphoryl, —$CF_3$, —$CCl_3$, —F or —$NH_2$, and, if n=2, $R_{11}$ is a —$(CH_2)_m$—group in which m is the number 2 to 8, or $R_{11}$ is phenyl-lene or naphthylene which is unsubstituted or is sub-stituted, for example, by $C_1$–$C_{12}$-alkyl.

Many intermediates of the formula III, IV, V, VI and VII are known compounds which can be prepared by known processes, for example by the processes which are described in Houben-Weyl, Methoden der organischen Chemie ("Methods of Organic Chemistry"): volume V/4, pages 171 to 189, for the compounds of the formula V, volume IX, pages 411 and 563, for the compounds of the formula IV, and, for the compounds of the formula III, the literature references A. 526, 143, 164 (1936), Am. Soc. 76, 4,402 (1954) or Z. obsc. Chim. 34, 3,165 (1964). Other intermediates of the formula III, IV, V, VI and VII are novel and therefore also form a subject of the present invention. They are prepared analogously to the known compounds.

The curing catalysts according to the invention are added to the resins in an amount which is adequate for curing. The amount required depends not only on the nature of the resin but also on the intended curing temperature and curing time. In general, 0.1 to 10% by weight, preferably 0.5 to 5% by weight, based on the solvent-free resin, are used. It is also possible to employ mixtures of the curing catalysts according to the invention.

Suitable acid-during resins are any resins, the curing of which can be accelerated by acid catalysts. These are, in particular, lacquers based on acrylic, polyester, alkyd, melamine, urea and phenolic resins, but especially mixtures of acrylic, polyester or alkyd resins with one another or with a melamine resin. These also include modified lacquer resins, for example acrylicmodified polyester or alkyd resins. Examples of various types of resins which are included under the term acrylic, polyester and alkyd resins are described, for example, in Wagner, Sarx/Lackkunstharze ("Synthetic Resins for Paints") (Munich, 1971), pages 86 to 123 and 229 to 238, or in Ullmann/Encyclopädie der techn. Chemie ("Ullmann's Encyclopedia of Industrial Chemistry"), 4th edition, volume 15 (1978), pages 613 to 628. Acid catalysis is particularly important for curing lacquers containing etherified amino resins, for example methylated or butylated melamine resins (N-methoxymethylmelamine or N-butoxymethylmelamine or methylated]-butylated glycol-urils and the like), for example:

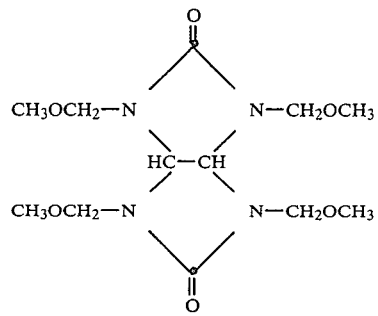

Further resin compositions are mixtures of polyfunctional alcohols or aryl and polyester resins containing hydroxyl groups, or partially saponified polyvinyl acetate or polyvinyl alcohol containing polyfunctional dihydropyranyl ethers, for example derivatives of 3,4-dihydro-2H-pyran-2-carboxylic acid.

Resin compositions containing monomeric or oligomeric constituents having polymerisable, unsaturated groups are also used for specific purposes. Resin compositions of this type can also be cured by the process according to the invention. In this process it is possible to use concomitantly, in addition, free-radical polymerisation initiators or photo-initiators, for example those belonging to the category of aromatic ketones, benzoin compounds, benzylketals, or α-hydroxyacetophenone derivatives, or the compounds of the formulae I or II. The former initiate the polymerisation of the unsaturated groups during heat treatment and the latter during UV irradiation. In certain cases it is also possible to add H-donors. Resin compositions of this type containing unsaturated components can also be polymerised by electron radiation. However, in addition to the polymerisation of the unsaturated components, an acid-catalysed crosslinking must always be carried out (if necessary during stoving).

The lacquers can be solutions or dispersions of the lacquer resin in an organic solvent or in water, but they can also be solvent-free. Lacquers having a low proportion of solvent, so-called "high-solids lacquers" are of particular interest. The lacquers can be clear lacquers, such as are used, for example in the automobile industry, as top lacquers of multi-layer coatings. They can also contain pigments, both inorganic or organic pigments, and also metal powders for metallic effect lacquers.

The following compositions according to the invention constitute further special preferred forms of the invention:

(a) A composition which, as an acid-curable resin, is an amino resin or a mixture of an amino resin with another acid-curable resin.

(b) A composition which, as the acid-curable resin, contains a phenolic resin or a mixture of such a resin with another acid-curable resin.

(c) A composition which, as the resin, contains a mixture of at least one polymerisable compound having one or more polymerisable, ethylenically unsaturated bonds, and at least one aminoplast, such as a melamine resin or a urea-aldehyde resin, and, in addition, contains free-radical polymerisation initiators and, if desired, photo-initiators.

Examples of polymerisable compounds having one or more polymerisable, ethylenically unsaturated bonds are esters of acrylic and methacrylic acid, hydroxyethyl esters of acrylic and methacrylic acid, diacrylates and polyacrylates and also dimethacrylates and polymethacrylates of glycols and polyols, aromatic vinyl and divinyl derivatives, N-methylol derivatives of acrylamide or methacrylamide, vinyl alkyl ethers, trimethylolpropane diallyl ether mono-(meth)acrylates, reaction products of glycidyl (meth)acrylate and monocarboxylic or dicarboxylic acids, polyester resins formed from α- β-unsaturated dicarboxylic acids or anhydrides thereof and diols, urethane acrylates or polyepoxy polyacrylates.

Preferred compositions are those consisting of (A) 80–99% by weight of a polymerisable compound having one or more ethylenically unsaturated bonds, (B) 1 to 20% by weight of at least one amino-plast, such as a melamine-formaldehyde or urea-formaldehyde resin, and (C) 0.1 to 10% by weight, based on the total of A and B, of a curing catalyst of the formula I.

The lacquers can also contain minor amounts of special additives, such as are customary in the technology of lacquers, for example flow control assistants, thixotropic agents, light stabilisers, antioxidants or photoinitiators.

Examples of light stabilisers are those belonging to the category comprising hydroxyphenylbenztriazoles, hydroxybenzophenones, cyanoacrylates, hydroxyphenyltriazines, oxalanilides, organic nickel compounds or polyalkylpiperidine derivatives. Since light stabilisers of the UV absorber type can interfere with the UV irradiation according to the invention, light stabilisers of this type can also be added to an adjacent lacquer layer, from which they then gradually diffuse into the layer, to be protected, of stoving lacquer. The adjacent lacquer layer can be a primer under the stoving lacquer or a top lacquer over the stoving lacquer.

A further possible means of avoiding the disturbing effect of the UV absorber consists in using so-called "blocked UV absorbers" such as are described, for example, in German Offenlegungsschrift No. 2,648,367. Products which, in the course of a photo-Fries rearrangement form UV absorbers, for example resorcinol monobenzoate or certain salicylic acid esters, are also suitable.

Polymethylpiperidine derivatives or combinations thereof with UV absorbers are used preferentially.

The invention also relates to a process for curing acid-curable resins in the presence of curing catalysts of the formula I or II by irradiation with shortwave light, followed by warming.

The irradiation of the resin with shortwave light is preferably effected by means of UV light, for which there are nowadays a number of suitable industrial devices. These contain medium-pressure, high-pressure or low-pressure mercury vapour lamps and also fluorescent tubes having emission maxima of 250 to 400 nm. The irradiation times required depend on the film thickness of the resin, on its pigmentation, on the candle-power of the lamps and on the distance of the lamps. An unpigmented lacquer in a customary layer thickness requires an exposure time of a few seconds in conventional UV irradiation devices. The latent catalyst has undergone photochemical transformation within this time, with the formation of free sulfonic acid.

If photosensitisers are added to the resin, the irradiation can also be carried out with daylight lamps. Examples of known photosensitisers are condensed aromatic compounds, for example perylene, aromatic amines (such as are described, for example, in U.S. Pat. No. 4,069,054) or cationic and basic dyes (such as are described, for example, in U.S. Pat. No. 4,026,705).

Since the acid-curing takes place very slowly at room temperature, it is necessary for carrying out the process industrially for the irradiation to be followed by a heat treatment. In contrast with other processes using heat-cleavable curing catalysts, however, this can be carried out at relatively low temperatures. Stoving temperatures of about 70° to 80° C. are sufficient at a stoving time of about 30 minutes and if about 2% of catalyst are used. If 1% of catalyst is used, temperatures of about 80° to 100° C. are required and, if 0.5% of catalyst is used, temperatures of about 100° to 120° C. are required. It is preferable to cure the resins catalysed in accordance with the invention at temperatures below 130° C., after irradiation. As against this, stoving temperatures exceeding 130° C. are required for curing using known amine salts of sulfonic acids (without irradiation).

These relatively low stoving temperatures of the process according to the invention are of considerable industrial importance for coating or lacquering heat-sensitive substrates. Examples of these are articles made of wood or cardboard, but particularly articles containing components made of plastics or rubbers, for example electrical equipment, vehicles of all kinds or machines.

A further advantage compared with other one-component resins containing a curing catalyst is that the one-component systems according to the invention can be stored virtually indefinitely at room temperature, since the effective catalyst is only formed when irradiated.

The process according to the invention is suitable for all types of industrial coating and lacquering, for example for the lacquering of machinery, vehicles, ships or structural components. It is of particular importance for automobile lacquering. In this field it can be employed in one-layer lacquering as well as in multi-layer lacquering. The use of the process is also of particular interest for the continuous coating of sheet-metal, for example steel or aluminium sheet, by the so-called coil-coating process. The process is also suitable for curing acid-curable printing inks, which are particularly suitable for tin-printing because of their outstanding absorption capacity.

If the process according to the invention is used on moulding materials, casting resins and laminating resins, the resins can first be irradiated in a thin film and then shaped under hot conditions to form any desired articles, and cured. If, however, articles of a relatively low thickness are involved, the resins can also be shaped first and then irradiated and heated. The film thickness used in the irradiation of the resins can be several millimeters, depending on their transparency. The process finds a further possible use in the production of relief forms, for example printing plates. In this case the solid or liquid, acid-curable resin composition, which can also contain unsaturated monomers/prepolymers, is first effected through a negative film. This is followed, if desired, by a heat after-treatment, in which the exposed areas become crosslinked. Finally, the printing plate is developed by washing out the non-crosslinked portions.

The examples which follow illustrate the process in greater detail by reference to specific compositions according to the invention. In these, parts are parts by weight and % are percentages by weight.

EXAMPLE 1

Curing a lacquer based on an acrylic-melamine resin

Aluminium sheets 0.5 mm thick, which have been coated with a white-pigmented priming lacquer based on a polyester resin, are coated with a high-solids clear lacquer of the following composition:

53.7 parts of acrylic resin (Paraloid ® OL 42, Rohm & Haas Co., USA),
19.2 parts of melamine resin (Cymel ® 301, American Cyanamide Co.),
1.9 parts of cellulose acetobutyrate (CAB ® 551,001, Eastman Chem. Co.),
10.5 parts of n-butanol,
10.1 parts of butyl acetate,
2.9 parts of a flow control assistant (Byketol ® Spezial, Byk-Mallinckrodt),
0.3 part of a flow control assistant (Modaflow ®, Monsanto Company) and
0.63 part of a curing catalyst.
[Binder content, expressed as solids: 19.2 parts of melamine resin + 42.96 parts of acrylic resin = 62.16 parts]

The catalyst is previously dissolved in part of the butanol. The lacquer has a solids content of 62.16 parts (binders). The amount of catalyst is therefore 1%, based on solvent-free binder.

The lacquer is applied with an electrical film applicator in such a manner that the dry film thickness is about 30 μm. After being exposed to the air for a period of 15 minutes, the samples are exposed to UV irradiation for varying periods in a PPG irradiation apparatus equipped with 2 high-pressure mercury vapour lamps of 80 watt. The samples are then stoved for 30 minutes at 100° C. in a lacquer oven.

The degree of curing is assessed by determining the pendulum hardness of the lacquer film by Konig's method (DIN 53,157); this is done 30 minutes and 24 hours after stoving.

The discoloration (yellowing) is assessed by determining the colour shade difference E as specified in DIN 6,174.

The results are listed in Table 1.

TABLE 1

| Catalyst | Irradiation time (seconds) | Pendulum hardness (seconds) after: | | Colour shade difference ΔE |
|---|---|---|---|---|
| | | 30 mins | 24 hours | |
| 1-Benzoyl-1-(methyl- | 2,1 | 83 | 81 | 1,6 |
| sulfonyl)-oxy-cyclo- | 4,2 | 99 | 102 | 2,0 |

TABLE 1-continued

| Catalyst | Irradiation time (seconds) | Pendulum hardness (seconds) after: | | Colour shade difference ΔE |
|---|---|---|---|---|
| | | 30 mins | 24 hours | |
| hexane | 12,6 | 108 | 115 | 2,9 |

In addition, the stability on storage of the lacquer samples is checked by measuring their viscosity with the ICI cone and plate viscometer (DIN 53,229) during storage at 60° C. for 7 days.

In this method the viscosity is measured in poises. Table 2 shows the difference (Δη) between the viscosity thus measured and the viscosity of a catalyst-free sample of lacquer.

TABLE 2

| Catalyst | Difference in viscosity Δη in poises after storage at 60° C. for: | | | | | |
|---|---|---|---|---|---|---|
| | 0 | 1 | 2 | 3 | 4 | 7 days |
| 1-Benzoyl-1-(methyl-sulfonyl)-oxycyclohexane | 0.1 | 0.3 | 0.3 | 0.5 | 0.3 | 0.5 |

EXAMPLE 2

The following base resin formulation is used as a basis:

| | | Solids |
|---|---|---|
| Hexamethoxymethylmelamine (Cymel ® 301, 100%) | 17.93 g | 17.93 parts |
| Butyl acetate | 9.73 g | |
| Cellulose acetobutyrate (CAB ® 551,001, Eastman Chem.) | 1.83 g | |
| Silicone resin in an organic solvent (flow control assistant Byketol ® Spezial, Byk-Mallinckrodt) | 2.80 g | |
| Flow control assistant having a polymer basis (Medaflow ®, 1% solution; Monsanto) | 0.29 g | |
| Hydroxyl-functional acrylic resin (Paraloid ® AT 410, 73% by weight Rohm & Haas) | 57.30 g | 41.83 parts |
| n-Butanol | 10.12 g | |
| | 100.00 g | 59.76 parts |

The compounds listed in Table 3 are incorporated into this resin formulation in a concentration of 1% by weight (based on solvent-free binder = 59.76 parts). Testing is carried out as described in Example 1. The results are shown in Table 3. In this table, the stability on storage at 60° of the lacquer samples is shown in terms of viscosity measurements (viscosity is measured at 20° and quoted in poises).

TABLE 3

| Catalyst | Exposure time, seconds | Pendulum hardness in seconds after: | | Colour shade difference ΔE | Stability after storage at 60° C., expressed as poises at 20° C., after: | | | | | |
|---|---|---|---|---|---|---|---|---|---|---|
| | | 30 mins. | 24 hours | | 0 | 1 | 2 | 3 | 4 | 7 days |
| (structure: benzoyl-CH-O-SO2-tolyl with phenyl) | 0 | 52 | 63 | 0.2 | 3.1 | 4.0 | 5.2 | 6.8 | 8.0 | 11.2 |
| | 2.1 | 147 | 168 | 0.5 | | | | | | |
| | 4.2 | 163 | 181 | 0.7 | | | | | | |
| | 8.4 | 171 | 191 | 1.3 | | | | | | |
| | 12.6 | 172 | 192 | 1.8 | | | | | | |

TABLE 3-continued

| Catalyst | Exposure time, seconds | Pendulum hardness in seconds after: 30 mins. | Pendulum hardness in seconds after: 24 hours | Colour shade difference ΔE | Stability after storage at 60° C., expressed as poises at 20° C., after: 0 | 1 | 2 | 3 | 4 | 7 days |
|---|---|---|---|---|---|---|---|---|---|---|
| Ph-C(O)-CH₂-O-SO₂-C₆H₄-CH₃ | 0 | 18 | 17 | 0.6 | 3.0 | 3.4 | 4.1 | 4.7 | 5.6 | 8.8 |
| | 2.1 | 148 | 154 | 0.5 | | | | | | |
| | 4.2 | 174 | 187 | 0.5 | | | | | | |
| | 8.4 | 183 | 196 | 0.8 | | | | | | |
| | 12.6 | 183 | 196 | 1.1 | | | | | | |

EXAMPLE 3

Further lacquer films were prepared in accordance with Example 2, and their pendulum hardness as specified in DIN 53,157 was determined in order to assess the degree of curing, and the colour shade difference ΔE as specified in DIN 6,174 was determined in order to assess discoloration/yellowing. The results are shown in Table 4.

TABLE 4

| Catalyst | Irradiation time (seconds) | Pendulum hardness in seconds after: 30 mins | Pendulum hardness in seconds after: 24 hours | Colour shade difference ΔE |
|---|---|---|---|---|
| Ph-C(O)-CH(CH₃)-OSO₂-camphoryl | 0 | 19 | 21 | 0.5 |
| | 2.1 | 128 | 136 | 0.2 |
| | 4.2 | 166 | 181 | 0.2 |
| | 8.4 | 179 | 195 | 0.1 |
| | 12.6 | 179 | 195 | 0.3 |
| Ph-C(O)-C(CH₃)₂-OSO₂-camphoryl | 0 | 22 | 27 | 0.5 |
| | 2.1 | 132 | 143 | 0.1 |
| | 4.2 | 168 | 183 | 0.2 |
| | 8.4 | 179 | 194 | 0.4 |
| | 12.6 | 182 | 197 | 0.7 |
| Ph-C(O)-C(CH₃)₂-O-TOS* | 0 | 39 | 42 | 0.4 |
| | 2.1 | 179 | 191 | 0.2 |
| | 4.2 | 189 | 197 | 0.1 |
| | 8.4 | 188 | 202 | 0.1 |
| | 12.6 | 179 | 201 | 0.4 |
| Ph-C(O)-CH₂-OSO₂-camphoryl | 0 | 25 | 29 | 0.2 |
| | 2.1 | 127 | 137 | 0.2 |
| | 4.2 | 167 | 182 | 0.1 |
| | 8.4 | 182 | 199 | 0.2 |
| | 12.6 | 185 | 203 | 0.5 |
| Ph-C(O)-CH(CH₃)-OSO₂-(CH₂)₇-CH₃ | 0 | 7 | 8 | 0.3 |
| | 2.1 | 106 | 117 | 0.1 |
| | 4.2 | 151 | 169 | 0.5 |
| | 8.4 | 169 | 189 | 0.6 |
| | 12.6 | 171 | 191 | 0.8 |
| H₃CS-C₆H₄-C(O)-CH(CH₃)-O-TOS | 0 | 8 | 10 | 0.3 |
| | 2.1 | 175 | 191 | 0.3 |
| | 4.2 | 176 | 193 | 0.6 |
| | 8.4 | 179 | 197 | 1.3 |
| | 12.6 | 177 | 198 | 1.6 |
| Naphthyl-C(O)-CH(CH₃)-O-TOS | 0 | 11 | 11 | 0.2 |
| | 2.1 | 69 | 73 | 0.2 |
| | 4.2 | 99 | 104 | 0.3 |
| | 8.4 | 136 | 148 | 0.9 |
| | 12.6 | 154 | 174 | 1.2 |
| Ph-C(O)-C(CH₃)₂-OSO₂-(CH₂)₇-CH₃ | 0 | 31 | 34 | 0.2 |
| | 2.1 | 136 | 145 | 0.4 |
| | 4.2 | 164 | 181 | 0.4 |
| | 8.4 | 177 | 193 | 0.6 |
| | 12.6 | 177 | 198 | 0.9 |

TABLE 4-continued

| Catalyst | Irradiation time (seconds) | Pendulum hardness in seconds after: 30 mins | 24 hours | Colour shade difference ΔE |
|---|---|---|---|---|
| 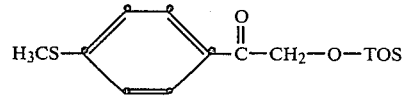 | 0<br>2.1<br>4.2<br>8.4<br>12.6 | 11<br>174<br>179<br>182<br>183 | 15<br>191<br>197<br>196<br>198 | 0.3<br>0.6<br>0.8<br>1.3<br>1.8 |
| 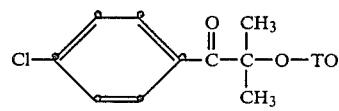 | 0<br>2.1<br>4.2<br>8.4<br>12.6 | 21<br>143<br>165<br>175<br>176 | 24<br>155<br>181<br>190<br>192 | 0.1<br>0.3<br>0.5<br>0.5<br>0.9 |
| 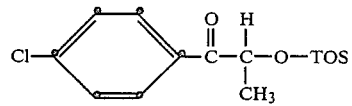 | 0<br>2.1<br>4.2<br>8.4<br>12.6 | 8<br>123<br>164<br>182<br>183 | 11<br>128<br>178<br>195<br>194 | 0.3<br>0.2<br>0.4<br>0.7<br>1.0 |
| 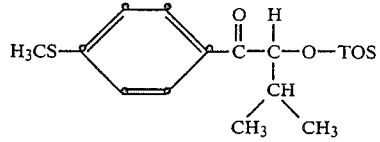 | 0<br>2.1<br>4.2<br>8.4<br>12.6 | 7<br>165<br>171<br>178<br>178 | 8<br>183<br>189<br>192<br>189 | 0.3<br>0.3<br>0.5<br>1.0<br>1.4 |
| 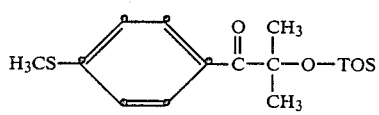 | 0<br>2.1<br>4.2<br>8.4<br>12.6 | 26<br>182<br>183<br>183<br>184 | 22<br>187<br>192<br>197<br>194 | 0.6<br>0.5<br>0.6<br>0.8<br>— |
| 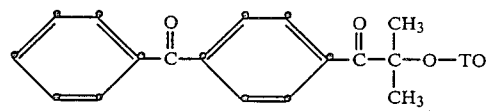 | 0<br>2.1<br>4.2<br>8.4<br>12.6 | 15<br>138<br>171<br>181<br>183 | 15<br>140<br>183<br>196<br>196 | 0.3<br>0.4<br>0.6<br>1.1<br>1.5 |
| 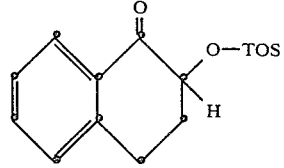 | 0<br>2.1<br>4.2<br>8.4<br>12.6 | 14<br>166<br>181<br>185<br>184 | 13<br>178<br>193<br>196<br>195 | 0.4<br>0.4<br>0.5<br>0.9<br>1.4 |
| 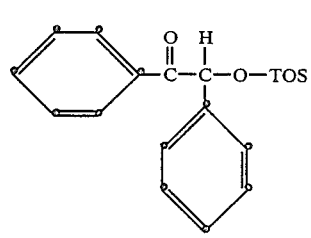 | 0<br>2.1<br>4.2<br>8.4<br>12.6 | 46<br>173<br>184<br>187<br>186 | 49<br>180<br>194<br>188<br>197 | 0.2<br>0.3<br>0.4<br>0.8<br>1.0 |
| 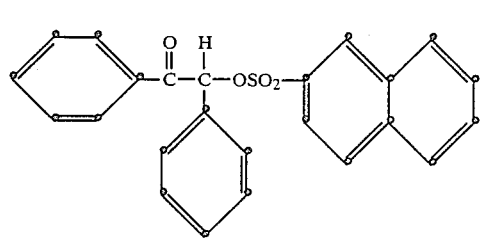 | 0<br>2.1<br>4.2<br>8.4<br>12.6 | 41<br>68<br>99<br>150<br>168 | 39<br>64<br>102<br>151<br>178 | 0.1<br>0.1<br>0.3<br>0.7<br>0.9 |

TABLE 4-continued

| Catalyst | Irradiation time (seconds) | Pendulum hardness in seconds after: 30 mins | 24 hours | Colour shade difference ΔE |
|---|---|---|---|---|
| 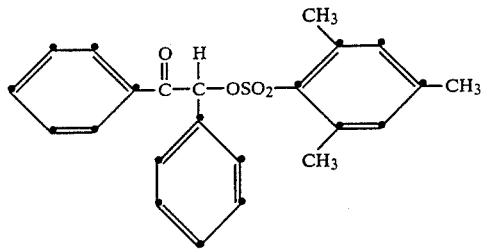 | 0<br>2.1<br>4.2<br>8.4<br>12.6 | 17<br>146<br>174<br>183<br>183 | 17<br>153<br>187<br>194<br>196 | 0.3<br>0.4<br>0.6<br>0.8<br>1.1 |
| 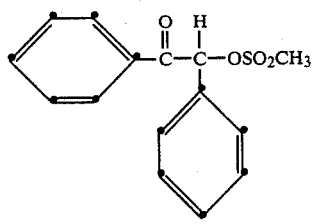 | 0<br>2.1<br>4.2<br>8.4<br>12.6 | 8<br>123<br>146<br>155<br>155 | 8<br>120<br>146<br>157<br>157 | 0.6<br>0.4<br>0.8<br>1.2<br>1.4 |
| 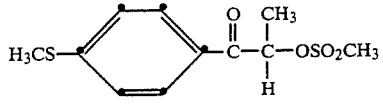 | 0<br>2.1<br>4.2<br>8.4<br>12.6 | 6<br>151<br>159<br>161<br>158 | 6<br>150<br>160<br>158<br>162 | 0.7<br>0.5<br>0.5<br>1.1<br>1.5 |
| 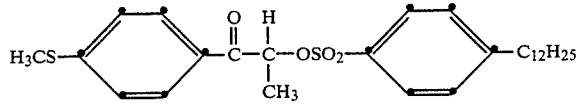 | 0<br>2.1<br>4.2<br>8.4<br>12.6 | 6<br>156<br>162<br>161<br>163 | 6<br>157<br>167<br>170<br>171 | 0.5<br>0.4<br>0.6<br>1.1<br>1.4 |
| 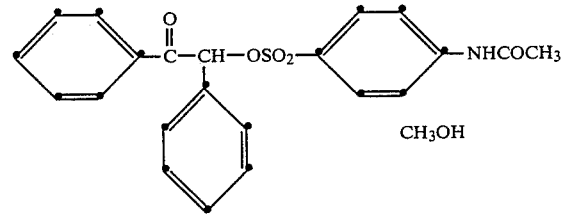<br>(contains 1 equivalent of $CH_3OH$) | 0<br>2.1<br>4.2<br>8.4<br>12.6 | 10<br>106<br>141<br>155<br>160 | 13<br>116<br>155<br>175<br>179 | 0.7<br>0.3<br>0.2<br>0.3<br>0.7 |
| 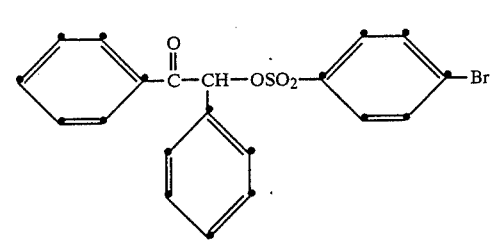 | 0<br>2.1<br>4.2<br>8.4<br>12.6 | 56<br>150<br>172<br>178<br>182 | 64<br>165<br>187<br>193<br>196 | 0.5<br>0.2<br>0<br>0.2<br>0.5 |
| 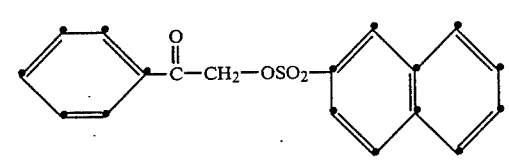 | 0<br>2.1<br>4.2<br>8.4<br>12.6 | 21<br>36<br>56<br>90<br>113 | 25<br>43<br>64<br>101<br>126 | 0.5<br>0.3<br>0.2<br>0<br>0.3 |

TABLE 4-continued

| Catalyst | Irradiation time (seconds) | Pendulum hardness in seconds after: 30 mins | 24 hours | Colour shade difference ΔE |
|---|---|---|---|---|
| 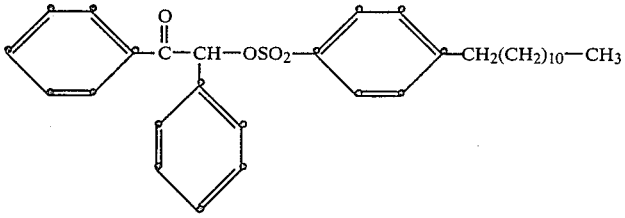 | 0<br>2.1<br>4.2<br>8.4<br>12.6 | 10<br>91<br>131<br>155<br>160 | 10<br>94<br>138<br>170<br>176 | 0.1<br>0.3<br>0.4<br>0.5<br>0.8 |
| 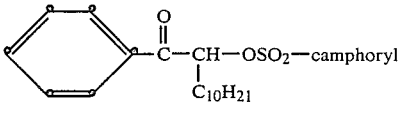 | 0<br>2.1<br>4.2<br>8.4<br>12.6 | 7<br>65<br>106<br>144<br>157 | 7<br>66<br>111<br>155<br>171 | 0.1<br>0.1<br>0.5<br>0.6<br>0.6 |
| 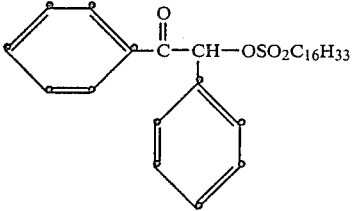 | 0<br>2.1<br>4.2<br>8.4<br>12.6 | 14<br>68<br>92<br>115<br>123 | 13<br>68<br>92<br>118<br>127 | 0.1<br>0.4<br>0.5<br>0.5<br>1.0 |
| 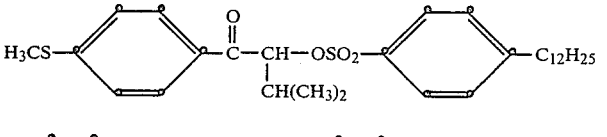 | 0<br>2.1<br>4.2<br>8.4<br>12.6 | 20<br>173<br>184<br>176<br>185 | 17<br>187<br>190<br>193<br>197 | 0.5<br>0.5<br>0.4<br>1.0<br>1.5 |
| 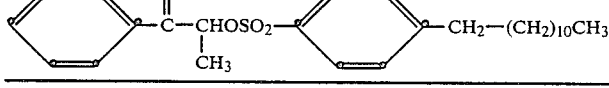 | 0<br>2.1<br>4.2<br>8.4<br>12.6 | 7<br>92<br>133<br>161<br>168 | 11<br>118<br>153<br>182<br>189 | 0.5<br>0.5<br>0.6<br>0.9<br>1.2 |

*TOS = tosyl = p-tolylsulfonyl

EXAMPLE 4

Further lacquer films were prepared in accordance with Example 2, and their pendulum hardness as specified in DIN 53,157 was determined in order to assess the degree of curing, and the colour shade difference ΔE as specified in DIN 6,174 was determined in order to assess discoloration/yellowing. The results are shown in Table 5.

TABLE 5

| Catalyst no. | | Irradiation time (seconds) | Pendulum hardness in seconds after: 30 mins | 24 hours | Colour, shade difference ΔE |
|---|---|---|---|---|---|
| 5.1 | Ph-CO-CH(CH₂C₆H₅)-O-TOS | 0<br>2,1<br>4,2<br>8,4<br>12,6 | 19<br>97<br>141<br>169<br>174 | 22<br>105<br>152<br>185<br>192 | 0,3<br>0<br>0,1<br>0,5<br>0,8 |
| 5.2 | Ph-CO-CH(C₁₀H₂₁)-O-TOS | 2,1<br>4,2<br>8,4<br>12,6 | 113<br>154<br>175<br>182 | 106<br>147<br>167<br>182 | 0,7<br>0,6<br>1,0<br>1,2 |
| 5.3 | Ph-CO-CH(CH₃)-O-TOS | 0<br>2,1<br>4,2<br>8,4<br>12,6 | 9<br>140<br>169<br>175<br>178 | 14<br>156<br>185<br>192<br>197 | 0,3<br>0,3<br>0,5<br>1,1<br>1,4 |

TOS = p-tolylsulfonyl

If the benzoyl group in compounds Nos. 5.1, 5.2 and 5.3 listed in Table 5 is replaced by a p-toluyl group, compounds are obtained which are also very suitable for use as curing catalysts and have test values similar to those listed in Table 5.

Similar test results are also given by the compound which was obtained when the benzyl group in compound 5.1 was replaced by an isopropyl group.

What is claimed is:

1. A curable composition which comprises
   (a) an acid-curable resin which is an amino resin or a phenolic resin, or a mixture of an amino resin or a phenolic resin with an alkyd, polyester or acrylic resin, and
   (b) an effective amount of a curing catalyst which is a compound of formula I or II

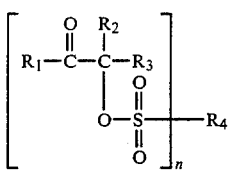  I

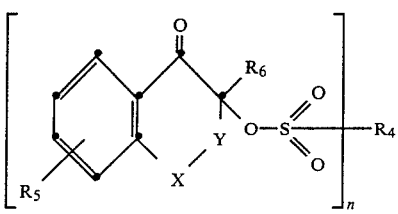  II in which n is the number 1 or 2 and $R_1$ is phenyl or naphthyl which is unsubstituted or substituted by 1, 2 or 3 radicals belonging to the group comprising —Cl, —Br, —CN, —NO$_2$, $C_1$-$C_{12}$-alkyl, $C_1$-$C_4$-alkoxy, phenoxy, tolyloxy, phenylthio, tolylthio, $C_1$-$C_8$-alkylthio, —SCH$_2$CH$_2$OH, $C_1$-$C_4$-alkylsulfonyl, phenylsulfonyl, $C_2$-$C_4$-alkoxycarbonyl, $C_1$-$C_4$-alkylamino, $C_2$-$C_4$-dialkylamino, phenyl—CONH, $C_1$-$C_4$-alkyl-CONH— or benzoyl, or $R_1$ is also anthryl, phenanthryl, thienyl, pyridyl, furyl, indolyl or tetrahydronaphthyl, and $R_2$ is hydrogen or $C_1$-$C_8$-alkyl which is unsubstituted or substituted by —OH, —Cl, $C_1$-$C_4$-alkoxy, —CN, $C_2$-$C_5$-alkoxycarbonyl, phenyl, chlorophenyl, $C_7$-$C_{10}$-alkylphenyl or $C_7$-$C_{10}$-alkoxyphenyl, or is also benzoyl, $R_3$ is as defined for $R_2$ and is also phenyl which is unsubstituted or substituted by —Cl, $C_1$-$C_4$-alkyl, $C_1$-$C_4$-alkoxy or $C_1$-$C_4$-alkylthio, $C_2$-$C_8$-alkoxycarbonyl, —CN, $C_1$-$C_4$-alkyl-NHCO—, phenyl-NHCO— or —CONH$_2$, or $R_2$ and $R_3$, together with the carbon atom to which they are attached, constitute a $C_4$-$C_6$-cycloalkyl ring, X is —O—, —S—, —SO$_2$—, —CH$_2$—, —C(CH$_3$)$_2$— or >N—COR$_7$, $R_7$ being $C_1$-$C_4$-alkyl or phenyl, and Y is a direct bond or —CH$_2$—, and, if n=1, $R_4$ is $C_1$-$C_{18}$-alkyl, phenyl which is unsubstituted or substituted by halogen, $C_1$-$C_{12}$-alkyl, $C_1$-$C_4$-alkoxy, $C_1$-$C_4$-alkyl-CONH—, phenyl-CONH—, —NO$_2$ or benzoyl, naphthyl which is unsubstituted or substituted by halogen, $C_1$-$C_{12}$-alkyl or $C_1$-$C_4$-alkoxy, $C_5$-$C_6$-cycloalkyl, $C_7$-$C_9$-aralkyl, camphoryl, —CF$_3$, —CCl$_3$, —F or —NH$_2$, and, if n=2, $R_4$ is a —(CH$_2$)$_m$— group in which m is the number 2 to 8, or $R_4$ is phenylene or naphthylene which is unsubstituted or substituted by $C_1$-$C_{12}$-alkyl, $R_5$ is H or 1, 2 or 3 radicals belonging to the group comprising —Cl, —Br, —NO$_2$, $C_1$-$C_{12}$-alkyl, $C_1$-$C_4$-alkoxy, phenoxy, phenylthio, $C_1$-$C_8$-alkylthio or —SCH$_2$CH$_2$OH, and $R_6$ is hydrogen or $C_1$-$C_8$-alkyl which is unsubstituted or substituted by —OH, —Cl, $C_1$-$C_4$-alkoxy, —CN, $C_2$-$C_5$-alkoxycarbonyl, phenyl, chlorophenyl, $C_7$-$C_{10}$-alkylphenyl or $C_7$-$C_{10}$-alkoxy-phenyl, phenyl which is unsubstituted or substituted by —Cl, $C_1$-$C_4$-alkyl, $C_1$-$C_4$-alkoxy or $C_1$-$C_4$-alkylthio, $C_2$-$C_8$-alkoxycarbonyl or —CN.

2. A composition according to claim 1, in which the curing catalyst is a compound of the formula I in which $R_1$ is phenyl or naphthyl which is unsubstituted or is substituted by —Cl, —Br, $C_1$-$C_8$ alkyl, $C_1$-$C_4$-alkoxy, phenoxy, tolyloxy, phenylthio, tolylthio, —SCH$_2$CH$_2$OH, $C_1$-$C_8$-alkylthio or benzoyl, or is anthryl or phenanthryl, $R_2$ is hydrogen or $C_1$-$C_8$ alkyl which is unsubstituted or is substituted by —OH, —Cl, —CN, $C_2$-$C_5$-alkoxycarbonyl, phenyl, chlorophenyl, $C_7$-$C_{10}$-alkylphenyl or $C_7$-$C_{10}$-alkoxy-phenyl and $R_3$ is the same as $R_2$, as defined above, and is also phenyl which is unsubstituted or is substituted by —Cl, $C_1$-$C_4$-alkyl, $C_1$-$C_{14}$-alkoxy or $C_1$-$C_4$-alkyl-thio, or is $C_2$-$C_4$-alkoxycarbonyl or —CN, or $R_2$ and $R_3$, together with the carbon atom to which they are attached, form a $C_4$-$C_6$-cycloalkyl ring and, if n=1, $R_4$ is $C_1$-$C_{18}$-alkyl, phenyl which is unsubstituted or is substituted by —Cl, $C_1$-$C_{12}$-alkyl or $C_1$-$C_4$-alkoxy, or is naphthyl which is unsubstituted or is substituted, by —Cl or $C_1$-$C_{12}$-alkyl, or $R_4$ is also camphoryl, —CF$_3$ or —F, and, if n=2, $R_4$ is a —(CH)$_m$ group, phenylene or naphthylene, m being the number 2, 3 or 4.

3. A composition according to claim 1, in which the curing catalyst is a compound of the formula I or II in which n is the number 1.

4. A composition according to claim 1 in which the curing catalyst is a compound of the formula I in which n=1, $R_1$ is phenyl which is unsubstituted or is substituted by chlorine, methyl, methoxy, methylthio, phenylthio, —SCH$_2$CH$_2$OH or benzoyl, $R_2$ is hydrogen or $C_1$-$C_4$-alkyl and $R_3$ is hydrogen, $C_1$-$C_4$-alkyl or phenyl, or $R_2$ and $R_3$, together with the carbon atom to which they are attached, form a cyclohexane ring, and $R_4$ is $C_1$-$C_{18}$-alkyl, phenyl or naphthyl which is unsubstituted or substituted by —Cl or $C_1$-$C_{12}$-alkyl, or camphoryl.

5. A composition according to claim 1, in which the curing catalyst is a compound of the formula II in which $R_5$ is hydrogen.

6. A composition according to claim 1, in which the curing catalyst is a compound of the formula II in which n=1, $R_5$ and $R_6$ are hydrogen, X and Y are a —CH$_2$-group and $R_4$ is $C_1$-$C_{18}$-alkyl, phenyl or naphthyl which is unsubstituted or substituted by $C_1$-$C_{12}$-alkyl, or also camphoryl.

7. A composition according to claim 1, in which the curing catalyst is a compound of the formula I in which n=1, $R_1$ is phenyl, p-tolyl or p-methylthiophenyl, $R_2$ is hydrogen, $R_3$ is methyl, isopropyl, n-decyl or benzyl and $R_4$ is phenyl, p-tolyl or p-n-dodecylphenyl.

8. A composition according to claim 1, in which the curing catalyst employed is one of the group consisting of the following compounds: 2-[(p-tolylsulfonyl)-oxy]-1-phenyl-1-propanone, 2-[(p-tolylsulfonyl)-oxy]-1-p-tolyl-1-propanone, 2-[(p-tolylsulfonyl)-oxy]-1-p-methylthiophenyl-1-propanone, 2-[(p-tolylsulfonyl)-oxy]-1,3-bis-phenyl-1propanone, 2-[(p-tolylsulfonyl)-oxy]-3-phenyl-1-p-tolyl-1-propanone, 2-[(p-tolylsulfonyl)-oxy]-3-methyl-1-phenyl-1-butanone, 2-[(p-tolylsulfonyl)-oxy]-3-methyl-1-p-tolyl-1-butanone, 2-[(p-tolylsulfonyl)-oxy]-1-phenyl-1-dodecanone, 2-[(p-tolylsulfonyl)-oxy]-1-p-tolyl-1-dodecanone, 2-[(p-laurylphenylsulfonyl)-oxy]-3-methyl-1-p-methylthiophenyl-1-butanone and 2-[(p-tolylsulfonyl)-oxy]-tetral-1-one.

9. A composition according to claim 1, wherein the curable composition contains 0.1 to 10% by weight, based on the solvent-free resin, of a curing catalyst of the formula I or II.

10. A composition according to claim 1, wherein the resin is a mixture of an amino resin with a resin containing ethylenic bonds.

11. A composition according to claim 1, which contains, as the acid-curable resin, a phenol-formaldehyde resin, a urea-formaldehyde resin or a mixture of a resin of this type with another acid-curable resin.

12. A composition according to claim 1, which contains, as the resin, a mixture of acrylates and melamine resins (hybrid systems) and, in addition, free-radical polymerisation initiators and photo-initiators.

13. An industrial lacquer composition according to claim 1.

14. A tin-printing ink composition according to claim 1.

* * * * *